(12) United States Patent  
Sands et al.

(10) Patent No.: US 8,903,430 B2  
(45) Date of Patent: Dec. 2, 2014

(54) LOCATION BASED OBJECT TRACKING

(75) Inventors: Ian M. Sands, Seattle, WA (US); V. Kevin Russ, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1660 days.

(21) Appl. No.: 12/035,277

(22) Filed: Feb. 21, 2008

(65) Prior Publication Data

US 2009/0215471 A1    Aug. 27, 2009

(51) Int. Cl.
| | |
|---|---|
| H04W 24/00 | (2009.01) |
| G01S 13/87 | (2006.01) |
| H04M 1/725 | (2006.01) |
| H04N 7/14 | (2006.01) |
| H04W 4/02 | (2009.01) |

(52) U.S. Cl.
CPC ......... *G01S 13/876* (2013.01); *H04M 1/72544* (2013.01); *H04M 2250/10* (2013.01); *H04M 2250/52* (2013.01); *H04W 4/02* (2013.01)
USPC ........................................ 455/457; 348/14.02

(58) Field of Classification Search
CPC ................................ H04W 4/02; H04W 64/00
USPC .......................................... 455/457; 348/14.02
See application file for complete search history.

(56) References Cited

U.S. PATENT DOCUMENTS

| | | | |
|---|---|---|---|
| 6,094,501 A | 7/2000 | Beatty | 382/154 |
| 6,353,398 B1 | 3/2002 | Amin et al. | 340/995 |
| 6,487,500 B2 | 11/2002 | Lemelson et al. | 701/301 |
| 6,672,506 B2 | 1/2004 | Swartz et al. | 235/383 |
| 6,741,188 B1 | 5/2004 | Miller et al. | 340/995.1 |
| D494,584 S | 8/2004 | Schlieffers et al. | D14/346 |
| 6,796,505 B2 | 9/2004 | Pellaumail et al. | 235/462.13 |
| 6,837,436 B2 | 1/2005 | Swartz et al. | 235/472.02 |

(Continued)

FOREIGN PATENT DOCUMENTS

| | | | | |
|---|---|---|---|---|
| WO | WO 0225973 A1 | 3/2002 | | H04Q 7/22 |
| WO | WO 0228125 A2 | 4/2002 | | H04Q 7/00 |
| WO | WO 2006 001129 A1 | 5/2006 | | G01C 15/00 |

OTHER PUBLICATIONS

Henrysson Anders and Ollila, Mark, [online], "UMAR—Ubiquitous Mobile Augmented Reality", MUM 2004 Oct. 27-29, 2004 College Park, MD, pp. 41-45. http://delivery.acm.org/10.1145/1060000/1052387/p41-henrysson.pdf?key1=1052387&key2=2146888811&coll=GUIDE&dl=GUIDE&CFID=28669898&CFTOKEN=74011579.

(Continued)

*Primary Examiner* — Christopher M Brandt  
*Assistant Examiner* — Muthuswamy Manoharan  
(74) *Attorney, Agent, or Firm* — Jessica Meyers; Jim Ross; Micky Minhas

(57) ABSTRACT

A user of a mobile device is able to display information about objects in the surrounding environment and to optionally interact with those objects. The information may be displayed as a graphical overlay on top of a real-time display of imagery from a camera in the mobile device with the overlay indexed to the real-time display. The graphical overlay may include positional information about an external object and may include navigational information intended to assist the user in moving to the object's location. There may also be a graphical user interface which allows the user to utilize the mobile device to interact with an external object.

20 Claims, 6 Drawing Sheets

(56) References Cited

U.S. PATENT DOCUMENTS

| | | |
|---|---|---|
| 7,010,501 B1 | 3/2006 | Roslak et al. ............... 705/26 |
| 7,040,541 B2 | 5/2006 | Swartz et al. ........... 235/472.02 |
| 7,063,263 B2 | 6/2006 | Swartz et al. ........... 235/472.02 |
| 7,158,780 B2 | 1/2007 | Bahl et al. ................. 455/414.1 |
| 7,171,378 B2 | 1/2007 | Petrovich et al. ............. 705/26 |
| 7,195,157 B2 | 3/2007 | Swartz et al. ................ 235/383 |
| 7,385,501 B2 | 6/2008 | Miller et al. ............ 340/539.13 |
| 2001/0030664 A1 | 10/2001 | Shulman et al. .............. 345/714 |
| 2004/0201500 A1 | 10/2004 | Miller et al. ............ 340/539.17 |
| 2005/0266858 A1 | 12/2005 | Miller et al. ............ 340/539.17 |
| 2005/0272442 A1 | 12/2005 | Miller et al. .............. 340/995.1 |
| 2006/0019676 A1 | 1/2006 | Miller et al. .............. 455/456.1 |
| 2006/0089792 A1 | 4/2006 | Manber et al. ............... 701/207 |
| 2006/0155466 A1* | 7/2006 | Kanda et al. ................. 701/209 |
| 2006/0160548 A1 | 7/2006 | Chen et al. ................... 455/466 |
| 2007/0149210 A1 | 6/2007 | McKiou et al. ........... 455/456.1 |
| 2007/0149222 A1 | 6/2007 | Hodko et al. ................ 455/461 |
| 2007/0174243 A1 | 7/2007 | Fritz ............................... 707/3 |
| 2007/0242131 A1* | 10/2007 | Sanz-Pastor et al. ...... 348/14.02 |
| 2008/0090591 A1 | 4/2008 | Miller et al. ............ 340/539.17 |
| 2008/0091537 A1 | 4/2008 | Miller et al. ................... 705/14 |
| 2008/0161018 A1 | 7/2008 | Miller et al. .............. 455/456.3 |
| 2010/0122208 A1* | 5/2010 | Herr et al. ..................... 715/799 |
| 2010/0161658 A1* | 6/2010 | Hamynen et al. ............. 707/770 |

OTHER PUBLICATIONS

Spohrer, Jim and Stein, Mitch, [online] "User Experience in the Pervasive Computing Age," IBM Research, Jan.-Mar. 2000, IEEE MultiMedia, pp. 12-17 http://ieeexplore.ieee.org/iel5/93/18133/00839306.pdf?isNumber=.

Scott, David; Sharp, Richard; Madhavapeddy, Anil; Upton, Eben, [online] "Using Visual Tags to Bypass Bluetooth Device Discovery," Mobile Computing and Communications Review, vol. 1, No. 2, pp. 1-12 http://www.cl.cam.ac.uk/research/srg/netos/papers/2005-mc2r-visualtags.pdf.

Rukzio, Enrico; Hakkila, Jonna; Ballagas, Rafael, "WikEye—Using Magic Lenses to Explore Georeferenced Wikipedia Content," Pervasive Mobile Interaction Devices (PERMID 2007) in conjunction with the 5th Int'l Conference on Pervasive Computing, 50 pp. http://www.permid.org/2007/pdf/proceedings_permid2007.pdf.

* cited by examiner

LOCATION BASED OBJECT TRACKING

BACKGROUND

Mobile electronic devices are commonplace. As they become more powerful, distinctions between types of devices, such as phones, cameras, and PDAs are blurring as each incorporates capabilities of the others. User reliance on these mobile devices and the ability to work with both images and data while remotely accessing additional information over wireless networks is growing.

While the individual technologies are becoming more widely available, the capabilities afforded by leveraging the synergy of combining these technologies are lagging. Appropriate combinations of emerging technologies can be used to assist users with task and workflow management in their increasingly complex work environments. Further integration with the information technology (IT) infrastructure and remotely accessible equipment interfaces can provide additional value.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Various aspects of the subject matter disclosed herein are related to a system and methods for presenting information as graphical overlays on a mobile device where the overlays are indexed to a viewfinder type real time imagery display. The graphical displays are generally related to finding and interacting with entities viewable in the viewfinder.

Certain aspects of the subject matter relate to providing navigational assistance to the user in moving from a starting position to the location of a known entity. This may include directional cues or path overlays. This may also include on-screen indicators of the location.

Other aspects relate to identifying known entities with which the user can interact and supporting that interaction. This may include on-screen overlays of status or commanding data indexed to the real time image of the entity, The approach described below may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the above summary can be obtained by reference to the accompanying drawings, which are briefly summarized below, to the following detailed description of present embodiments, and to the appended claims.

DETAILED DESCRIPTION

This detailed description is made with reference to the accompanying drawings, which form a part hereof, and which show, by way of illustration, specific exemplary embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

Operational Overview

At a high level, the system and methods described in the present disclosure provide the capability to merge data from multiple sources in order to generate real time feedback and assistance which can be incorporated into a user's workflow. A mobile device provides location information about the user as well as real-time imagery of the user's environment. Stored imagery data can be used in combination with the real-time imagery through imagery analysis to identify specific objects within that environment, determine the viewing angle/heading of the mobile device, and to identify known entities with which the user can interact further. Location information for fixed and portable equipment can be used in combination with the user's location to generate navigational information (i.e., paths or directions) to assist the user in locating the equipment. This information also supports on-screen cueing to identify equipment to the user. With a known entity identified on-screen, the user can then elect to interact with the entity via supported interfaces to acquire additional information or to provide data input or commands to the entity as appropriate.

System Architecture

Figure 1:
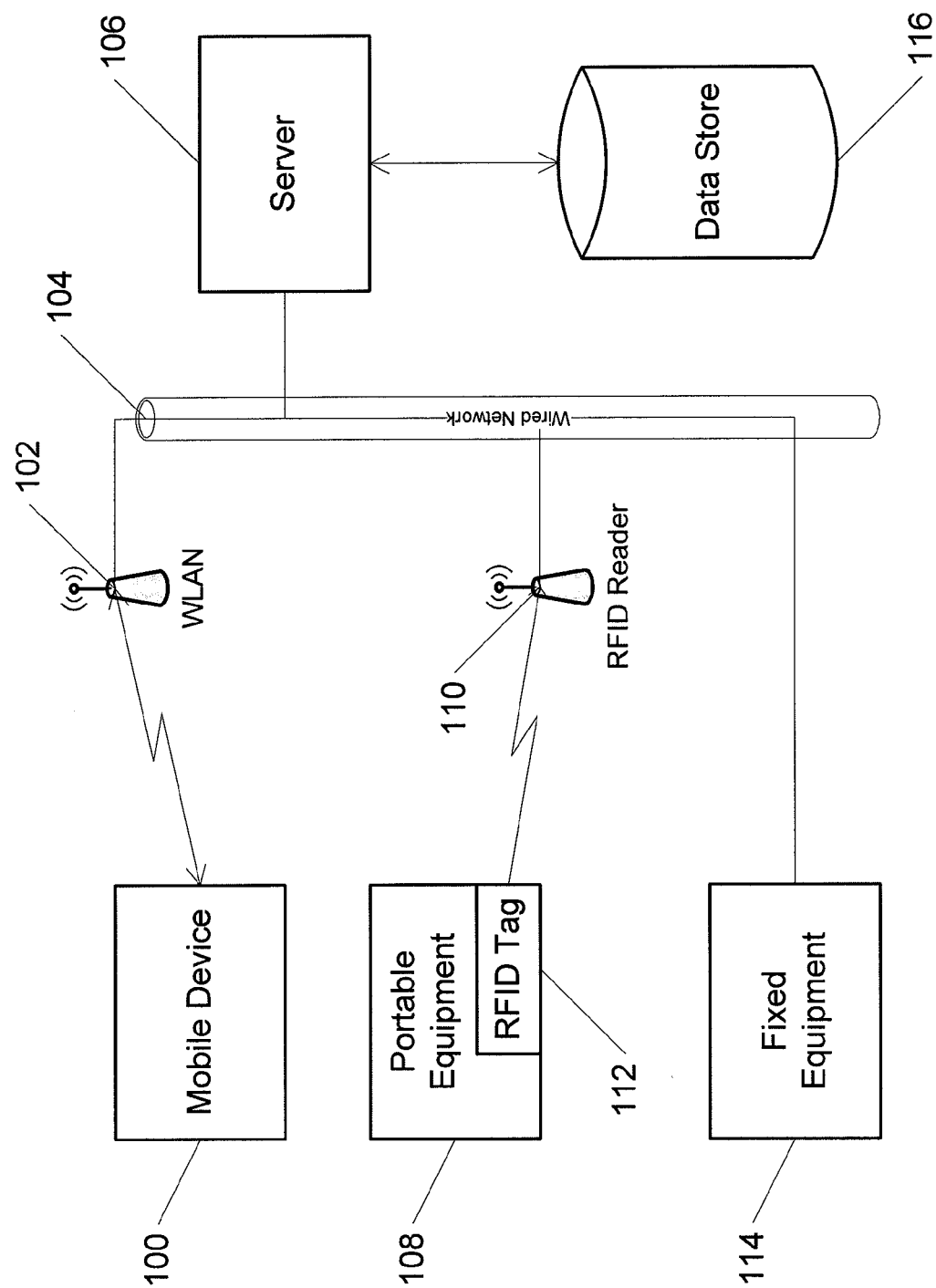
FIG. 1 is a block diagram illustrating an exemplary system architecture.

FIG. 1 is a block diagram of a simple exemplary system architecture which might be used in an implementation of the concepts of the present disclosure. Clearly additional components could be included and alternate implementations used. Only the basic elements are presented here in order to provide a framework for the following discussion.

Central to the system architecture is a network. The exemplary network comprises both a wired network 104 and wireless network 102. The wired portion 104 would typically provide connectivity to fixed components such as a server 106 and equipment with a fixed location 114. The wireless network 102 would typically provide connectivity to mobile devices 100 and optionally to portable equipment 108.

One mechanism for determining the location of the portable equipment 108 is to use radio frequency identification (RFID) tags. An RFID tag 112 attached to, or built into, the equipment can be scanned, or read, by one or more RFID readers 110 allowing the system to determine the position of the equipment. Alternate configurations of the RFID readers can be used to provide the location accuracy needed to support the end user's needs. One method, known as the "smart shelf" approach utilizes separate readers for each shelf, bin, or container to allow the position to be localized at that granularity.

Data store 116 contains the non-real time data used by the system. This includes static imagery to support imagery analysis and metadata related to equipment, devices, and users known to the system. While illustrated as connected to a server, this is not required. Where the mobile device contains sufficient storage, the server could be eliminated with all processing and storage being on the mobile device.

Figure 2:
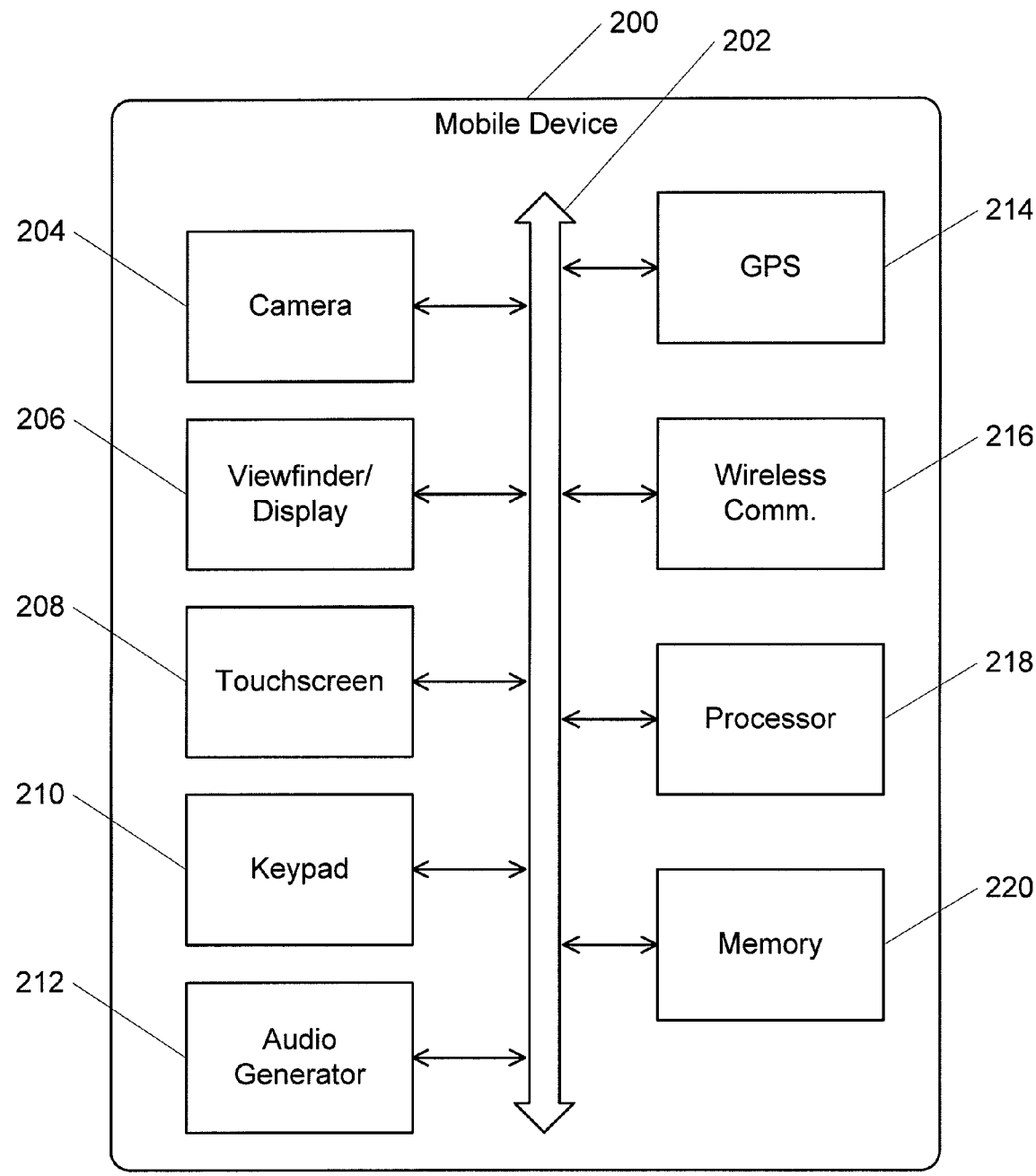
FIG. 2 is a block diagram showing the components of an exemplary mobile device.

FIG. 2 illustrates the functional components of an exemplary mobile device, 200, usable with the present disclosure. It has a processor 218, and memory 220, for storing and executing an operating system and software applications. The memory 220 generally includes both volatile memory (e.g., RAM) and non-volatile memory (e.g., ROM, PCMCIA cards, etc.). One or more input devices such as keypad 210 and touch screen 208 enable user input. One or more output devices such as display 206 and audio generator 212 provide for output to the user. Typically, display 206 and touch screen 208 are integrated into a single input/output component. System bus provides a data inter-connection between elements 204-220.

Camera 204 provides the capability to capture real-time video input. This input is used as the basis for imagery analysis as described herein and can also be fed to the display 206 so that it acts as a viewfinder, displaying the image currently available from the camera.

The mobile device would typically include some type of wireless communications device 216 which supports data interchange with other networked system components such as servers. An exemplary device would be an IEEE 802.11 compliant wireless local area network (WLAN) interface. Alternatively a cell phone connection or other radio frequency interface could be used.

The mobile device may be equipped with a GPS device 214 so that the device's location can be easily and accurately determined. Alternatively the location can be determined by other techniques such as triangulation of a WLAN or cell phone signal or through the use of an RFID tag.

Software Architecture

Figure 3:
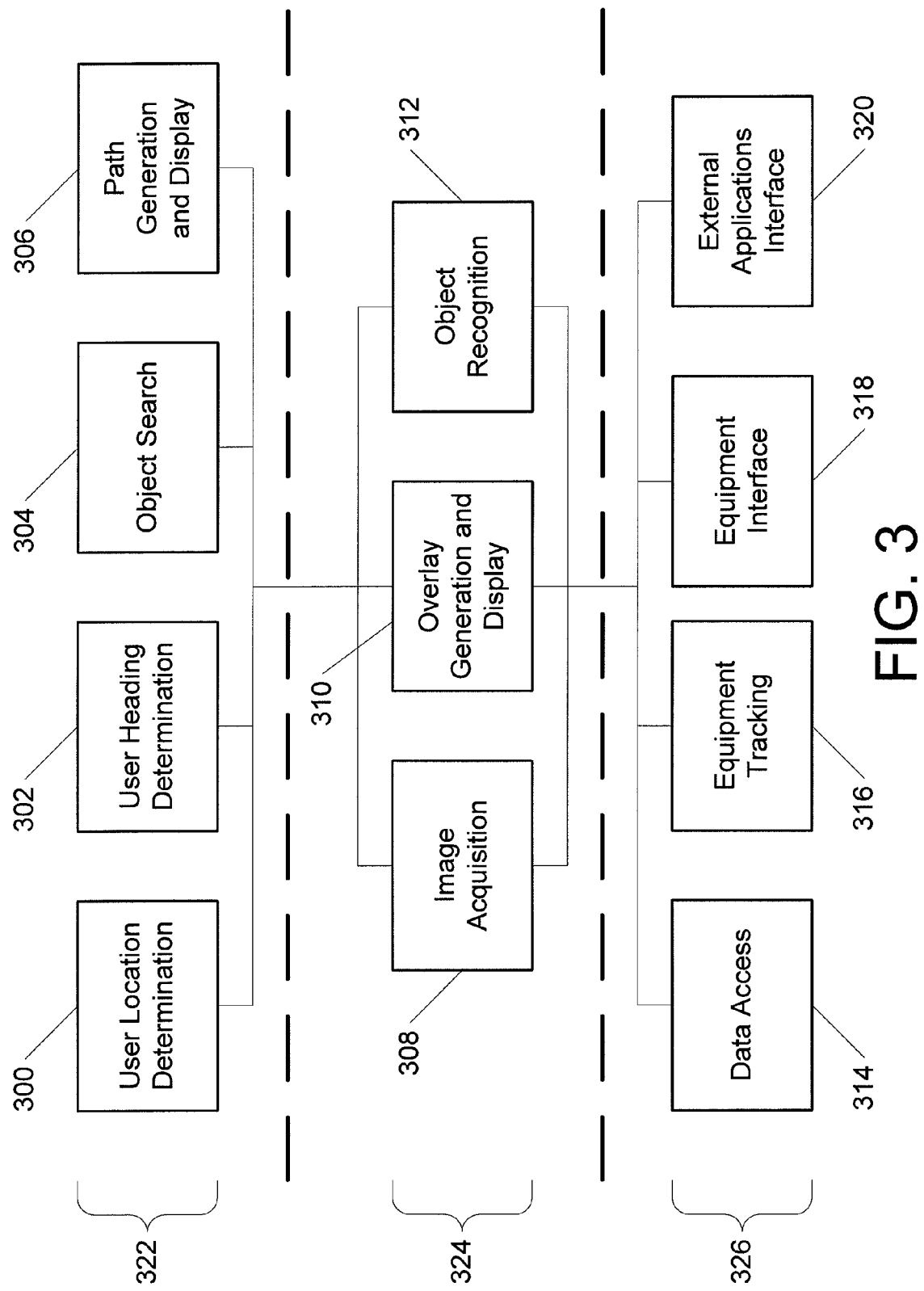
FIG. 3 is a block diagram illustrating an exemplary software architecture.

FIG. 3 illustrates an exemplary software architecture which implements the concepts of the present disclosure. Clearly other architectures are equally viable and the supported functionality can be partitioned in other ways. In general those components shown at a higher layer utilize one or more of the components shown at a lower layer.

The Top Layer 322 of the software architecture contains those components which support the most complex functionality. This is also the functionality which is most visible to the user. User Location Determination 300 determines where user is located within the reference coordinate system used by the system. This coordinate system may be a local grid, such as might be used within a factory, or it may be a broader system such as global latitude and longitude. Similar determination for items of equipment is handled in Equipment Tracking 316 discussed below. More precisely, User Location Determination 300 determines the location of a mobile device which is presumed to be physically collocated with the user. That location is also applied to the camera 204 in order to determine heading and for indexing of graphical overlays (see below). Location determination is typically real time or near real time allowing the user to continually move about while interacting with the system. Varieties of methods are viable and are applicable to the present disclosure. The most direct method is to use a GPS receiver within the mobile device and have the mobile device provide the GPS location information to the system via the WLAN. Alternatively, an RFID system could be used, especially where such a system is used to track portable equipment as described below. A further alternative would be to use triangulation of the signal from a WLAN network interface card or cell phone interface. Any method which can generate a user location to the requisite level of accuracy is acceptable.

User Heading Determination 302 supplements the user's location by determining the direction in which they are facing. The location merely specifies the point in space at which the user is positioned. They can be looking in any direction from this point. In order to provide appropriate visual cuing the system must be able to determine the direction the user is looking. As above, this determination is actually performed for the mobile device and presumed to be that of the user. More specifically, it is performed for the camera 204, applied to the mobile device, and then used for the user. Image Acquisition 308 is used to obtain imagery from the mobile device's camera. This imagery and the user's location are provided to the Object Recognition 312 component in order to identify one or more objects in the user's environment. When a match is made, metadata about an identified object can be used to find its location relative to the user and this can be used to calculate the direction in which the camera is pointed. This direction is referred to herein as the heading.

Where the user has requested navigational assistance, Path Generation and Display 306 provides an on-screen overlay to assist the user. Knowing the user's current location and a selected destination, the system can calculate a path for the user to follow. The user location and heading allows context sensitive prompting. For example, the path can be overlaid on the viewfinder image. Where the path itself is not visible on the view finder, appropriate directions can be given to aim the camera so that it becomes visible. When the user complies with the directions, the path will be highlighted as it comes into view. As the user moves along the path they can continually monitor the display or periodically reference the display for updates. As an alternative, or where heading information can not be determined, a 2 dimensional map can be displayed rather than an overlay.

Where the user has requested assistance in locating a piece of equipment the Object Search component 304 provides onscreen cuing. If the user is some distance away from the equipment, Path Generation and Display 306 will first be used to get the user into close proximity of the equipment. Object Search 304 will then direct the user to a specific location. Equipment Tracking 316 is used to obtain the location of the equipment for which the user is searching. This is used in combination with the user's location and heading data to determine when the equipment location is within the view finder. This location is then highlighted or otherwise indicated to the user. The method of cuing may be user selectable and may also be configurable to be distance sensitive. One example of user selectable cuing is to use either a simple "X" (or other icon) to indicate the location or to use a graphic representation of the item of equipment. Another example is to highlight or outline a container, rack, or other repository within which the equipment is located. Distance sensitive cuing would be of value in an equipment locker environment. Fore example, from the doorway, the correct rack or cabinet would be identified and as the user approaches the rack, the correct drawer or bin would be identified.

The Middle Layer 324 of the software architecture contains components which are more focused on specific tasks and support the top level components. Image Acquisition 308 serves to capture and make available imagery from the mobile devices camera. These images are then displayed on the mobile device, providing a viewfinder-like display mode. This serves as the underlying foundation over which graphical information is layered. The acquired images are also used by Object Recognition 312 as the basis for its imagery analysis.

Overlay Generation and Display 310 creates graphical overlays, indexes them to the imagery on the display, and presents them to the user. These overlays may be any type of graphical information which supports the higher level components such as route markings, directional arrows, equipment icons, and highlighting. The highlighting may take various forms but the essential aspect is to visually emphasize a part of the on-screen image to draw the user's attention to it. Exemplary methods include outlining, cross-hatching, and the use of translucent coloring. The overlays are indexed to the image such that the graphical information is displayed as aligned with the associated objects in the real-time image (i.e., a cabinet outline will overlay the edges of the cabinet image). This indexing uses the user location and heading information which, as discussed above, is actually the location and heading of the mobile device 200 and for the purposes of Overlay Generation and Display 310 is the location and heading of the camera. The direct association of graphical data with the real word entities displayed on-screen eases the user's task of interpreting the information presented.

Object Recognition 312 plays an important role in several aspects of the system. By processing the real time imagery from the mobile device's camera, a fundamental transformation of data to information is achieved. Rather than merely a picture of an object in the environment, mapping an image to a known entity allows the system to access metadata about that entity and to reason over that data. At the simplest level, user queries can be answered (i.e., What is the entity?). The location of the object relative to the mobile device allows the viewing direction of the camera to be determined and graphical overlays to be indexed to the displayed image. Additional metadata can indicate whether an interface to the entity is available and how to activate it. While Object Recognition 312 can be used to generate heading information it can also function independently.

In an exemplary embodiment, the Object Recognition 312 component is hosted on the mobile device for optimal user experience. Necessary stored image data will be retrieved from server side storage by the Data Access 314 component and transferred to the mobile device as needed. The exemplary solution would provide predictive transfer of images based on the continually updated position of the mobile device. Alternatively, Object Recognition 312 could be performed on the server with real-time imagery supplied to the server. As a further alternative all data storage, data access, and Object Recognition 312 could be handled by the mobile device.

The Bottom Layer 326 of the software architecture provides data and command access and interfaces. The Data Access 314 component provides read/write access to data stores. In an exemplary embodiment, these data stores are primarily, but not exclusively server side data including stored images and metadata for the known environmental entities. A geographic information system (GIS) data store may be used but not required.

The Equipment Tracking 316 component maintains metadata about the items of equipment which are known to the system. This includes location information for both fixed position and portable equipment. It may also include additional data such as operational status. In the case of fixed equipment, location determination will likely be a one-time event and may well use manual data entry of the position. The location of portable equipment will be updated periodically or upon detection of a change in position. As with User Location Determination 300 the location of portable equipment may be determined by one or more of a variety of methods. Some equipment may be equipped with a GPS receiver and the ability to provide the GPS location information to the system via the communications link. Alternatively, an RFID system could be used, with each piece of equipment individually tagged and a system of RFID readers used to locate the equipment as described above. A further alternative would be to use triangulation of the signal from a WLAN network interface card or cell phone interface embedded in the equipment. Any or all of these methods, as well as others, could be used in combination. The specific technique(s) would likely be hidden from the rest of the system with the Equipment Tracking component 316 providing a uniform interface to the data by other system components.

The Equipment Interface 318 provides data and commanding interfaces to the supported equipment. These interfaces might range from a simple data interface which provides equipment status to an equipment-specific graphical user interface (GUI) which provides access to some or all of the equipment's operational interface in a form factor which is compatible with the mobile device. An exemplary embodiment of the Equipment Interface 318 would comprise a generic API which would allow the set of supported equipment to be easily extended. Leveraging the Object Recognition 312 component, a GUI could be made readily available for any on-screen entity which the system recognizes as a known piece of equipment. The user would merely point the mobile device camera at the equipment; the Object Recognition 312 component would recognize it and retrieve the associated metadata. That metadata would indicate that an interface was available and an icon (or similar) would be presented to the user. Selecting the icon would activate the GUI. Alternatively, where the user has been using the navigational capabilities of the system to move to a specific piece of equipment, the system could detect the user's proximity to their destination and automatically present the appropriate GUI. This may be configured as the default behavior or a policy driven decision such as activating the GUI when the equipment initiated the user's action by issuing an alert or if the equipment is reporting an error status. Alternatively, this proximity determination could be made by analyzing the real-time image of the equipment and comparing it to stored imagery to calculate a distance.

Further leveraging the system capabilities, some or all of the GUI could be presented as a graphical overlay, indexed to the image of the actual equipment. Status information or command availability would be mapped to specific components or subsystems of the equipment. Where the piece of equipment is complex, comprising multiple subsystems, such an overlay would assist in isolating problems to the specific subsystem at fault.

The External Applications Interface 320 would provide data and/or control interfaces to applications outside of the system. Example applications might include a calendar/scheduling application (i.e., to identify portable equipment associated with a pending appointment); an inference engine to provide more complex reasoning; an alerting interface to allow equipment to request attention; or an equipment reservation application to reserve portable equipment once located as well as various other applications.

Operational Scenario A

Figure 4:
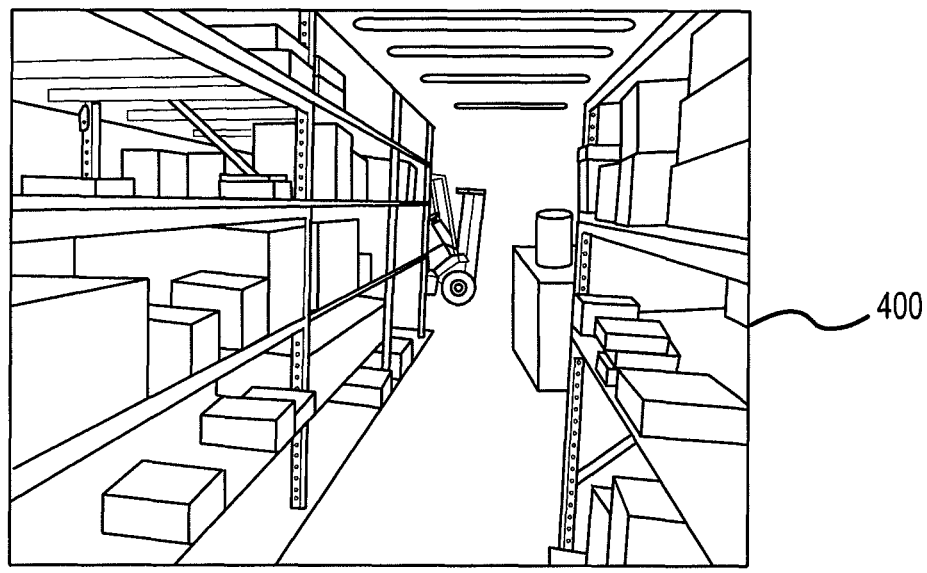
FIG. 4 illustrates an exemplary viewfinder image.

A line manager at an automotive manufacturing plant is making her rounds when she receives an incoming notification on her mobile phone, alerting her of an equipment malfunction in a different area of the plant. As part of that notification she is presented with an on-screen option to 'locate equipment.' When she selects this option, the system activates the Location Determination component 300 to determine her location and the Equipment Tracking component 316 to determine the location of the equipment. The Image Acquisition 308 component is activated to obtain imagery from the mobile phone's camera. The imagery is fed back to the phone's display to provide a viewfinder display 400 as shown in FIG. 4, and is fed to Heading Determination 302 to determine the camera's viewing angle. Heading Determination 302 provides the imagery to Object Recognition 312 which uses the newly determined user location to retrieve stored images from the Data Access 314 component which are associated with that location. Imagery analysis techniques are used to compare the camera imagery with the stored images. Matching entities in the real time view with known entities from the stored images allows the camera viewing direction (presumed to be the user's heading) to be determined.

Figure 5:
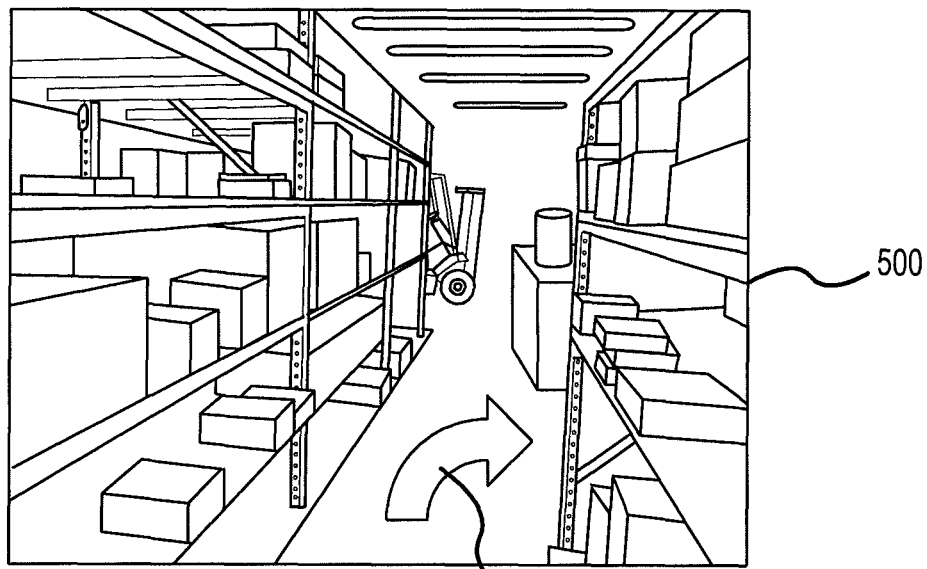
FIG. 5 illustrates an exemplary viewfinder image with a guidance overlay.

The user's location and the equipment's location are provided to Path Generation 306 to generate a navigable path to the equipment. This path along with the user location and heading are provided to Overlay Generation and Display 310 which generates a graphical path 502, indexes it to the camera imagery, and overlays it on the viewfinder display 500 on the phone as shown in FIG. 5. The user can then visually follow the path to the malfunctioning equipment. As she is walking, she is able to use her phone to reference the suggested path which is updated as the system tracks her progress in real-time, updating the graphical overlay.

As the user nears the location of the malfunctioning equipment, the proximity to the object in question is sensed and the system obtains a predefined set of information from the Equipment Tracking 316 component and displays it on the user's phone. She is able to continue using her phone as a enhanced view finder, directing it towards the equipment to get overlays of equipment status information obtained by the Equipment Interface 318 which could point out potential problem areas by location. She is also able to use an equipment specific GUI to interact with the equipment via the Equipment Interface 318. This allows her to perform functions such as running diagnostics, taking the machine offline, etc.

Operational Scenario B

Figure 6:
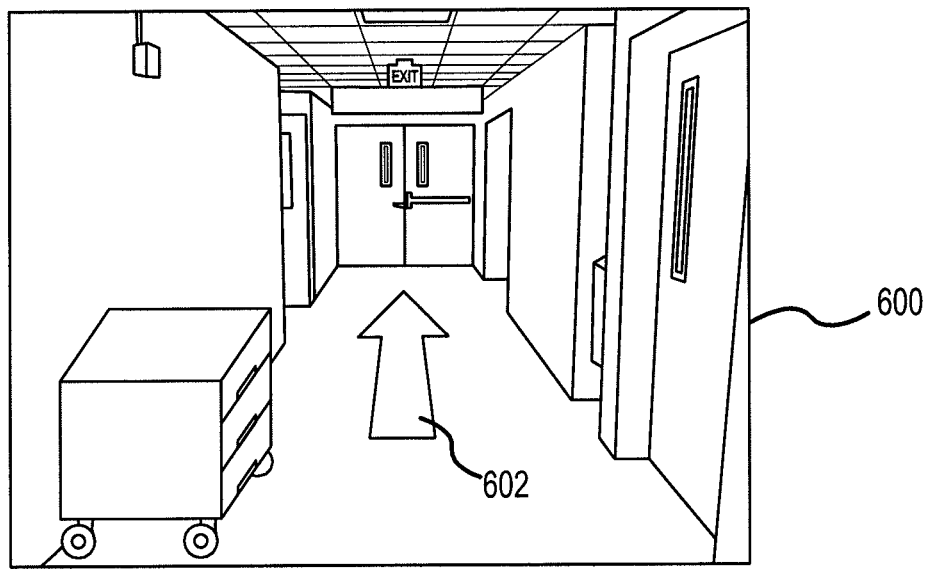
FIG. 6 illustrates a second exemplary viewfinder image with a guidance overlay.
Figure 7:
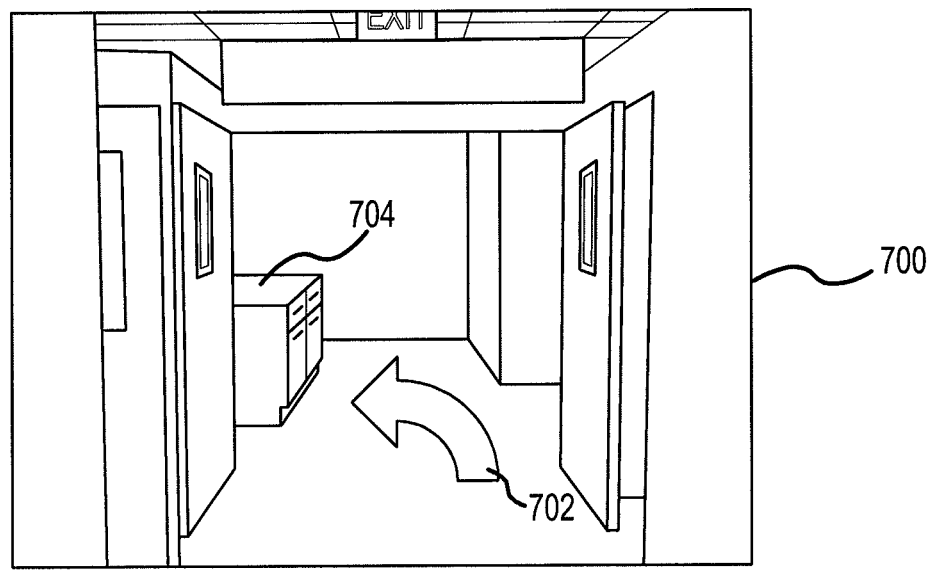
FIG. 7 illustrates a third exemplary viewfinder image with a guidance overlay.

A physician is making his rounds. He makes his way through the hospital, moving from one unit to the next visiting patients throughout the facility. As part of his workflow he encounters certain clinical exam scenarios that require the use of portable equipment which the hospital provides for use by physicians. As an example, as the doctor prepares for his next scheduled exam, he notices a reminder in his schedule that indicates he may need a digital ophthalmoscope. As he passes the shared equipment "storage lockers" he holds up his hand-held/mobile device, and activates the "object search" function. The doctor may manually specify the ophthalmoscope as the equipment for which to search or the system may be able to infer it from information from his scheduling software via the External Applications Interface 320. When the search function is activated, the system activates the Location Determination 300 component to determine his location and the Equipment Tracking component 316 to determine the location of the nearest available ophthalmoscope. The Image Acquisition component 308 is activated to obtain imagery from the mobile phone's camera. The imagery is fed back to the phone's display to provide a viewfinder display and is fed to Heading Determination 302 to determine the camera's viewing angle. Heading Determination 302 provides the imagery to Object Recognition 312 which uses the newly determined user location to retrieve stored images from the Data Access 314 component which are associated with that location. Imagery analysis techniques are used to compare the camera imagery with the stored images. Matching entities in the real time view with known entities from the stored images allows the camera viewing direction (presumed to be the user's heading) to be determined. If needed, on-screen cues are provided to direct the user to point the mobile device in the correct direction. If the doctor is beyond a selected distance away from the equipment location, Path Generation 306 and Overlay Generation 310 may be used as in Scenario A to provide navigation assistance into the vicinity of the storage area as shown in FIGS. 6 and 7. The image in viewfinder display 600 is overlaid by arrow 602 to provide guidance to the correct room. The image in viewfinder display 700 is overlaid by arrow 702 to provide guidance to the correct storage cabinet 704.

Figure 8:
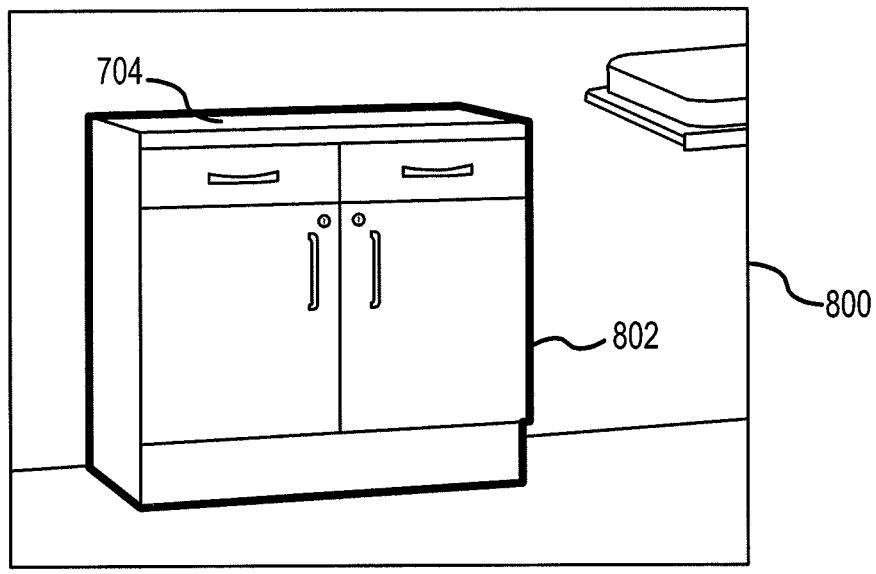
FIG. 8 illustrates an exemplary viewfinder image with a storage cabinet highlighted.
Figure 9:
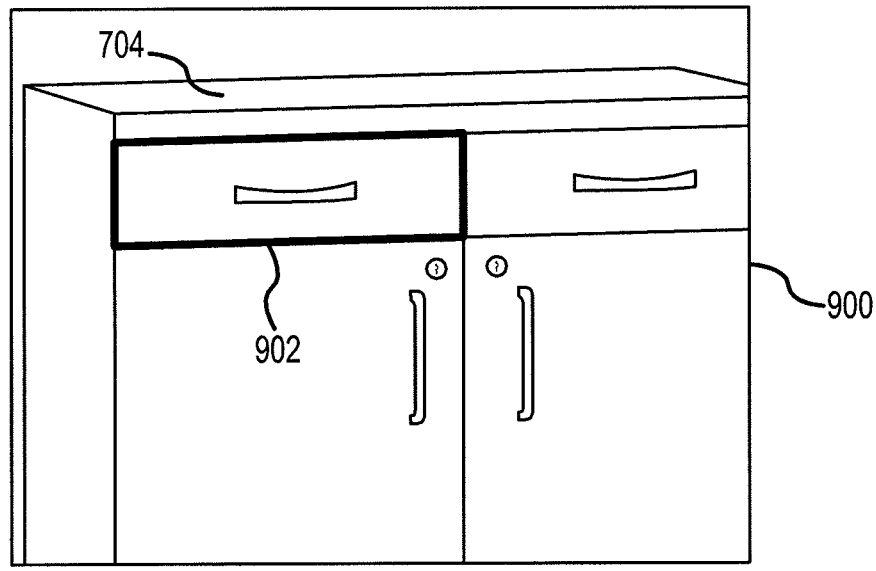
FIG. 9 illustrates an exemplary viewfinder image with a specific drawer in a storage cabinet highlighted.

When the specific storage cabinet is displayed on the viewfinder, Overlay Generation and Display 310 will overlay the viewfinder image to highlight the location. This may be by placing a bold or contrasting overlay, such as outline 802 around cabinet 704 in viewfinder display 800 as shown in FIG. 8, or by overlaying a digital image of the equipment on the image, or any similar visual prompt. As the user moves closer, the specific drawer within the cabinet will be highlighted with an overlay such as outline 902 in viewfinder display 900 shown in FIG. 9. With the item of equipment located the doctor can optionally select a function to check out the equipment and continue on his rounds with minimal interruption.

The system may include inference capability or use an external inference engine via the External Application Interface 320 to combine information from multiple sources. In this case, the doctor's schedule data, current time, and physical proximity to equipment storage support a decision that he is looking for the digital ophthalmoscope. This inference may support automatic activation of the Object Search 304 component when he brings his mobile device up into a position recognized as appropriate for viewing the surrounding area and may also support automatic selection of the specific item of equipment for which to search.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method of locating and interacting with an external object comprising:
   obtaining real-time imagery from a mobile camera;
   retrieving stored image data and metadata regarding a known environment, the known environment comprising a plurality of known objects;
   receiving a signal from a first object, the first object corresponding to a first known object of the plurality of known objects, the signal identifying a position of the first object relative to the mobile camera;
identifying a first stored position of the first known object relative to the plurality of known objects based on the stored image data and metadata;
comparing the real-time imagery to the stored image data and metadata to determine a position of the mobile camera relative to the plurality of known objects;
presenting the real-time imagery on a mobile display associated with the mobile camera;
determining information related to the first object based on the stored image data and metadata regarding the first known object;
presenting information related to the first object as a graphical overlay on the real-time imagery; and
accessing an operational interface of the first object via a user interface comprised in the graphical overlay, wherein accessing the operational interface of the first object comprises at least one of: sending data, receiving data, and sending commands.

2. The method of claim 1 further comprising:
determining a location of the mobile camera;
determining a heading of the mobile camera; and
using the location and the heading of the mobile camera for indexing the graphical overlay to the real-time imagery on the mobile display.

3. The method of claim 2 further comprising analyzing the real-time imagery to identify a second known object.

4. The method of claim 3 wherein determining the heading comprises calculating a relative bearing to the second known object having a second stored position.

5. The method of claim 3 further comprising:
accessing an operational interface associated with a second object corresponding to the second known object via the user interface comprised in the graphical overlay of the mobile display.

6. The method of claim 5 wherein the user interface is presented to the user in response to the mobile camera location moving to within a predetermined distance from the second object.

7. The method of claim 6 wherein the user interface comprises information about the second known object which is indexed to the image of the second object in the graphical overlay.

8. The method of claim 1, wherein the graphical overlay comprises a link to the user interface for accessing the operational interface of the object.

9. A method of locating and interacting with an object comprising:
obtaining real-time imagery from a mobile camera;
retrieving stored image data and stored metadata regarding a known environment, the known environment comprising a plurality of known objects;
receiving a signal from an object, the object corresponding to a known object of the plurality of known objects, the signal identifying a position of the object relative to the mobile camera;
identifying a stored position of the known object relative to the plurality of known objects based on at least one of: the stored image data and the stored metadata;
comparing the real-time imagery to the stored image data to determine a position of the mobile camera relative to the plurality of known objects;
presenting the real-time imagery on a mobile display associated with the mobile camera;
determining information related to the object based on at least one of: the stored image data and the stored metadata regarding the known object;
presenting the information as a graphical overlay on the real-time imagery; and
accessing an operational interface of the object via a user interface comprised in the graphical overlay, wherein accessing the operational interface of the object comprises at least one of: sending data, receiving data, and sending commands.

10. The method of claim 9 further comprising determining a heading of the mobile camera and using the position and the heading of the mobile camera to index the graphical overlay to the real-time imagery on the mobile display.

11. The method of claim 10 wherein the information comprises navigational information to the object.

12. The method of claim 11 wherein the navigational information comprises a highlighted path indexed to the real-time imagery.

13. The method of claim 10 wherein the graphical data overlay indicates a position of the object.

14. The method of claim 13 wherein the position of the object is indicated by highlighting a container within which the object is located.

15. A system for locating and interacting with external objects, the system comprising:
a mobile camera, having a known position, adapted to:
capture real-time imagery; and
supply the real-time imagery in a digital format;
a processor communicatively coupled to the mobile camera adapted to:
retrieve the real-time imagery;
retrieve stored image data and stored metadata regarding a known environment, the known environment comprising a plurality of known objects;
receive a signal from an object, the object corresponding to a known object of the plurality of known objects, the signal identifying a position of the object relative to the known position of the mobile camera;
identify a stored position of the known object relative to the plurality of known objects based on at least one of: the stored image data and the stored metadata;
compare the real-time imagery to the stored image data to determine a position of the mobile camera relative to the plurality of known objects; and
determine information related to the object based on the stored image data and the stored metadata regarding the known object;
a video display, physically proximate to the mobile camera and communicatively coupled to the processor, adapted to:
display the real-time imagery in a viewfinder mode; and
display the information related to the object as graphical data overlaid on and indexed to the real-time imagery, wherein the graphical data comprises a link to a user interface for accessing an operational interface of the object, wherein accessing the operational interface of the object comprises at least one of: sending data, receiving data, and sending commands.

16. The system of claim 15 wherein the graphical data indicates the position of the object.

17. The system of claim 16 wherein the position of the object is indicated by highlighting a container within which the object is located.

18. The system of claim 16 wherein the position of the object is indicated by highlighting a navigable path from the known position of the mobile camera to the position of the object.

19. The system of claim 16 wherein the object is portable and the processor tracks the position of the object as it is moved.

20. The system of claim 15 wherein the user interface is presented to the user in response to the mobile camera location moving to within a predetermined distance from the object.

* * * * *